United States Patent
Ritter, Jr. et al.

(10) Patent No.: US 10,086,768 B2
(45) Date of Patent: Oct. 2, 2018

(54) SUPPORT ASSEMBLY OF A VEHICLE

(71) Applicant: Ford Global Technologies, LLC, Dearborn, MI (US)

(72) Inventors: Donald Allen Ritter, Jr., Dearborn, MI (US); Kassandra Hibala Ritter, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 31 days.

(21) Appl. No.: 15/276,933

(22) Filed: Sep. 27, 2016

(65) Prior Publication Data
US 2018/0086278 A1    Mar. 29, 2018

(51) Int. Cl.
*B60R 9/10* (2006.01)
*B60R 9/06* (2006.01)

(52) U.S. Cl.
CPC . *B60R 9/10* (2013.01); *B60R 9/06* (2013.01)

(58) Field of Classification Search
CPC .................................... B60R 9/06; B60R 9/10
USPC ......................................................... 224/497
See application file for complete search history.

(56) References Cited

U.S. PATENT DOCUMENTS

| | | | | |
|---|---|---|---|---|
| 1,572,815 A * | 2/1926 | Schultz | ..................... | B60R 9/06 224/491 |
| 1,585,871 A * | 5/1926 | Pels | ......................... | B60R 9/06 224/491 |
| 1,886,911 A * | 11/1932 | Schulman | ................. | B60R 9/06 224/491 |
| 2,052,483 A * | 8/1936 | Monteith | .............. | B60R 19/023 224/491 |
| 3,251,520 A * | 5/1966 | Van Dyke | ................. | B60R 9/06 224/510 |
| 5,445,300 A * | 8/1995 | Eipper | ...................... | B60R 9/06 224/496 |
| 5,579,973 A * | 12/1996 | Taft | .......................... | B60R 9/06 224/495 |
| 6,889,880 B2 * | 5/2005 | Albaisa | .................... | B60R 9/06 224/489 |
| 7,121,597 B2 * | 10/2006 | Chuang | ..................... | B60R 9/06 293/117 |
| 7,806,307 B2 * | 10/2010 | Bergerhoff | ............. | B60R 9/048 224/282 |
| 7,854,358 B2 * | 12/2010 | Bergerhoff | ............... | B60R 9/06 224/281 |

(Continued)

FOREIGN PATENT DOCUMENTS

DE    102011121400 A1    6/2013

*Primary Examiner* — Peter Helvey
(74) *Attorney, Agent, or Firm* — Jason C. Rogers; Brooks Kushman P.C.

(57) ABSTRACT

A personal mobility device support assembly integrated with a vehicle includes a pair of assemblies, a connector member, and a bracket. Each of the pair of assemblies includes a housing secured within a rear panel portion of the vehicle, a first member mounted to translate from within the housing, and a second member pivotally mounted to the first member to rotate between stowed and deployed positions. The connector member secures ends of the second members to one another when in the deployed position. The bracket may be sized for mounting to one of the members to support a mobility device. The connector member may be adapted to secure ends of the third member to one another.

17 Claims, 6 Drawing Sheets

(56) References Cited

U.S. PATENT DOCUMENTS

| | | | |
|---|---|---|---|
| 7,909,213 B2 * | 3/2011 | Bergerhoff | B60R 9/10 224/197 |
| 7,992,751 B1 * | 8/2011 | Sweeney | B60R 9/06 224/497 |
| 8,418,902 B2 * | 4/2013 | Cha | B60R 9/10 224/488 |
| 9,120,429 B2 * | 9/2015 | Lungershausen | B60R 9/10 |
| 9,174,584 B1 * | 11/2015 | Cha | B60R 9/10 |
| 9,290,132 B2 * | 3/2016 | Anton | B60R 9/06 |
| 9,340,165 B2 * | 5/2016 | Ziola | B60R 9/10 |
| 9,346,412 B2 | 5/2016 | Cha et al. | |
| 9,376,062 B2 * | 6/2016 | Cha | B60R 9/06 |
| 9,428,117 B2 * | 8/2016 | Lee | B60R 9/10 |
| 9,533,624 B2 * | 1/2017 | Cha | B60R 9/06 |
| 9,783,120 B2 * | 10/2017 | Lungershausen | B60R 9/10 |
| 2005/0056672 A1 * | 3/2005 | Stewart | B60R 9/06 224/504 |
| 2007/0090142 A1 * | 4/2007 | Chuang | B60P 3/07 224/496 |
| 2007/0102465 A1 * | 5/2007 | Wezyk | B60R 9/06 224/321 |
| 2007/0205617 A1 * | 9/2007 | Hahn | B60P 1/6481 293/119 |
| 2008/0006665 A1 * | 1/2008 | Bergerhoff | B60R 9/06 224/497 |
| 2008/0142559 A1 * | 6/2008 | Lim | B60R 9/06 224/489 |
| 2010/0001029 A1 * | 1/2010 | Tai | B60R 5/041 224/499 |
| 2013/0182454 A1 * | 7/2013 | Hofmann | B60R 9/10 362/549 |
| 2014/0299642 A1 * | 10/2014 | Schatz | B60R 9/06 224/496 |
| 2016/0096483 A1 * | 4/2016 | Cha | B60R 9/06 224/496 |
| 2016/0288729 A1 * | 10/2016 | Cha | B60R 9/10 |

\* cited by examiner

SUPPORT ASSEMBLY OF A VEHICLE

TECHNICAL FIELD

This disclosure relates to vehicle support assemblies.

BACKGROUND

Effective and convenient transportation of recreational and personal mobility devices may present various challenges to users. The mobility devices may be mounted to support structures separate and external to a transport vehicle. Independent roof mounts or rear vehicle door mounts are examples of support structures which may be externally secured to the transport vehicle. However, issues may arise for the user when mounting the mobility devices to one of these independent, non-integral support structures.

This disclosure is directed to solving the above problems and other problems as summarized below.

SUMMARY

A personal mobility device support assembly integrated with a vehicle includes a pair of assemblies, a connector member, and a bracket. Each of the pair of assemblies includes a housing secured within a rear panel portion of the vehicle, a first member mounted to translate from within the housing, and a second member pivotally mounted to the first member to rotate between stowed and deployed positions. The connector member secures ends of the second members to one another when in the deployed position. The bracket is sized for mounting to one of the members to support a mobility device. Each of the pair of assemblies may further include a third member mounted to the second member for translation. The connector member may be adapted to secure ends of the third member to one another. Each of the first members may be sized to extend a predetermined distance such that the mobility device does not contact a bumper of the vehicle when mounted to the support assembly. The connector member may be secured to one of the second members to translate from within the one of the second members such that at least a portion of the connector member is outside of the one of the second members. The rear panel portion of the vehicle may define a cavity sized to receive one of the housings. A cover may be located adjacent the cavity and mounted to a vehicle body for pivotal movement between a closed position and an open position in which one of the pair of assemblies is accessible. The mobility device may be a bicycle, a stroller, a wheel chair, skis, a snowboard, or an inflatable aquatic floatation device.

A support assembly integrated with a vehicle includes a housing and a bracket. The housing is selectively accessible from within a panel portion of the vehicle and retains a first member mounted for translation between a stowed and a deployed position, and a second member mounted to the first member for pivotal movement. The bracket is mounted to one of the members to support a mobility device thereupon. One or more of the members may define one or more apertures sized to receive a fastener of the bracket. The bracket may include a sleeve sized to receive one of the members to mount the bracket thereto. The vehicle may include a vehicle body including a rear panel portion. The vehicle body and rear panel portion may be arranged with one another to define a cavity sized to receive the housing. A cover may be mounted adjacent to the cavity to selectively open to provide access to the housing and members. The first member may be arranged with the housing to translate a predetermined distance based on a location of a vehicle bumper. The second member may be arranged with the first member to pivot vertically relative to the vehicle.

A mobility device support assembly includes a pair of mount assemblies, a connector member, and a bracket. Each of the pair of mount assemblies includes a housing disposed within a cavity defined by a vehicle body, a first member mounted within the housing for translation between a stowed position within the housing and a deployed position in which at least a portion of the first member is extended outside the housing, a second member mounted at an end of the first member for pivotal movement, and a third member mounted to the second member for translation. The connector member is for securing opposing ends of each of the third members to one another. The bracket is for mounting to one of the members to support an item. The stowed position may be further defined as a position in which the mount assembly is concealed within a rear panel portion of the vehicle body. The deployed position may be further defined as a position in which the mount assemblies and bracket are arranged with the vehicle to support the item. One or more of the members may define at least one aperture sized to receiver a fastener of the bracket. The cavities may be located within a rear panel portion of the vehicle body. The assembly may include a pair of pivotable covers each located adjacent one of the cavities and each flush with an A-surface of the rear panel portion in a closed position and open to the respective housing to provide access thereto in an open position. The item may be a bicycle, a stroller, a wheel chair, skis, a snowboard, a tent, a back pack, luggage, a luggage carrier, tools, or an inflatable aquatic floatation device.

DETAILED DESCRIPTION

Embodiments of the present disclosure are described herein. It is to be understood, however, that the disclosed embodiments are merely examples and other embodiments can take various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
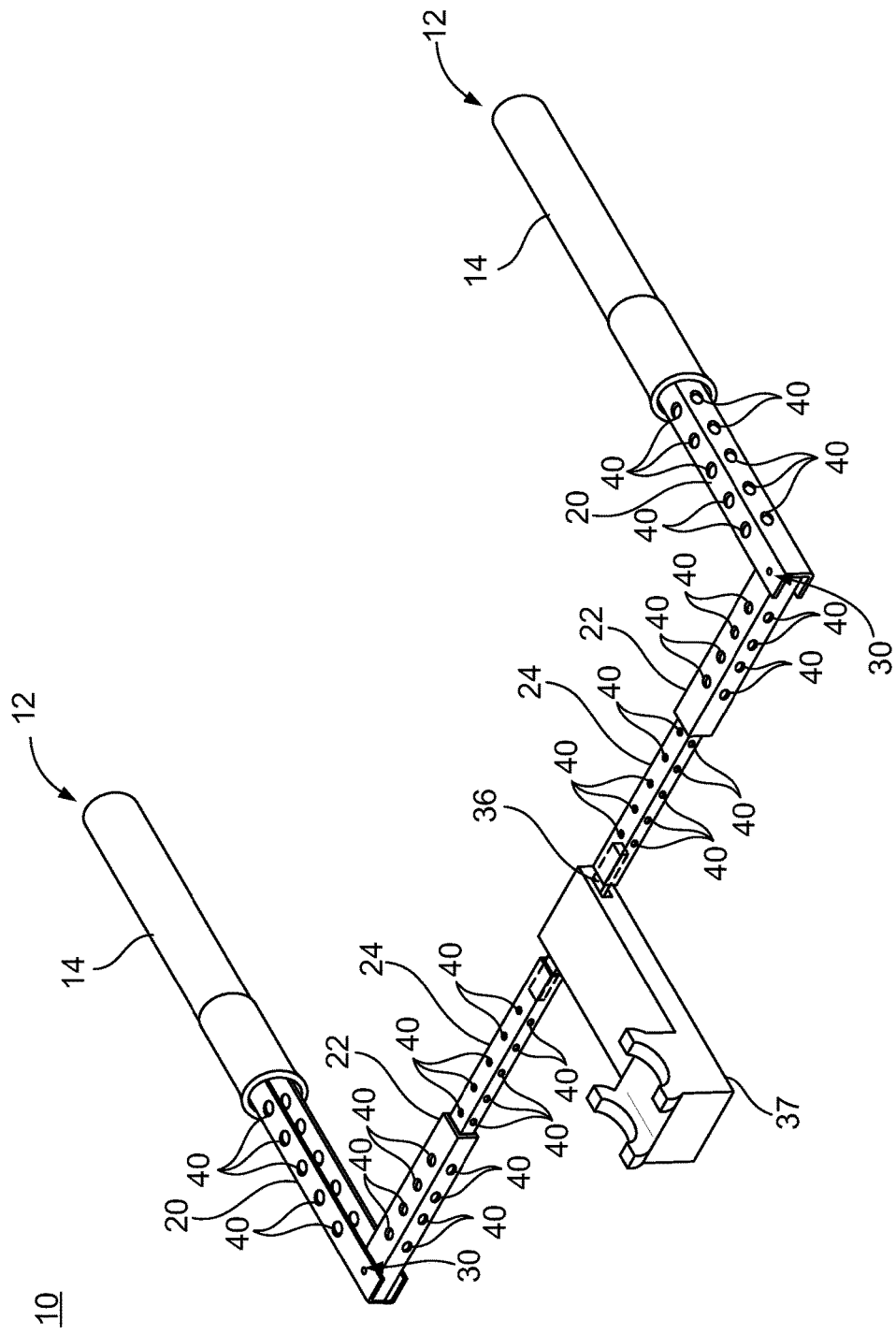
FIG. 1 is a perspective view of an example of a support assembly for a vehicle.

FIG. 1 shows an example of a support assembly for a vehicle, referred to as a support assembly 10 herein. The support assembly 10 may assist in mounting an item to a vehicle. For example, the support assembly 10 may assist in mounting a bicycle to an automobile. The support assembly 10 may also assist in mounting other types of items to the vehicle, such as a stroller, a foldable wheel chair, camping gear, skis, a snowboard, a tent, a back pack, luggage, a luggage carrier, tools, or an inflatable aquatic floatation devices. The support assembly 10 may include a pair of mount assemblies 12. It is contemplated that the support assembly 10 may include only one assembly 12. Each of the assemblies 12 may include a housing 14. Each of the housings 14 may contain components arranged with the respective housing to move between multiple configurations.

Figure 2:
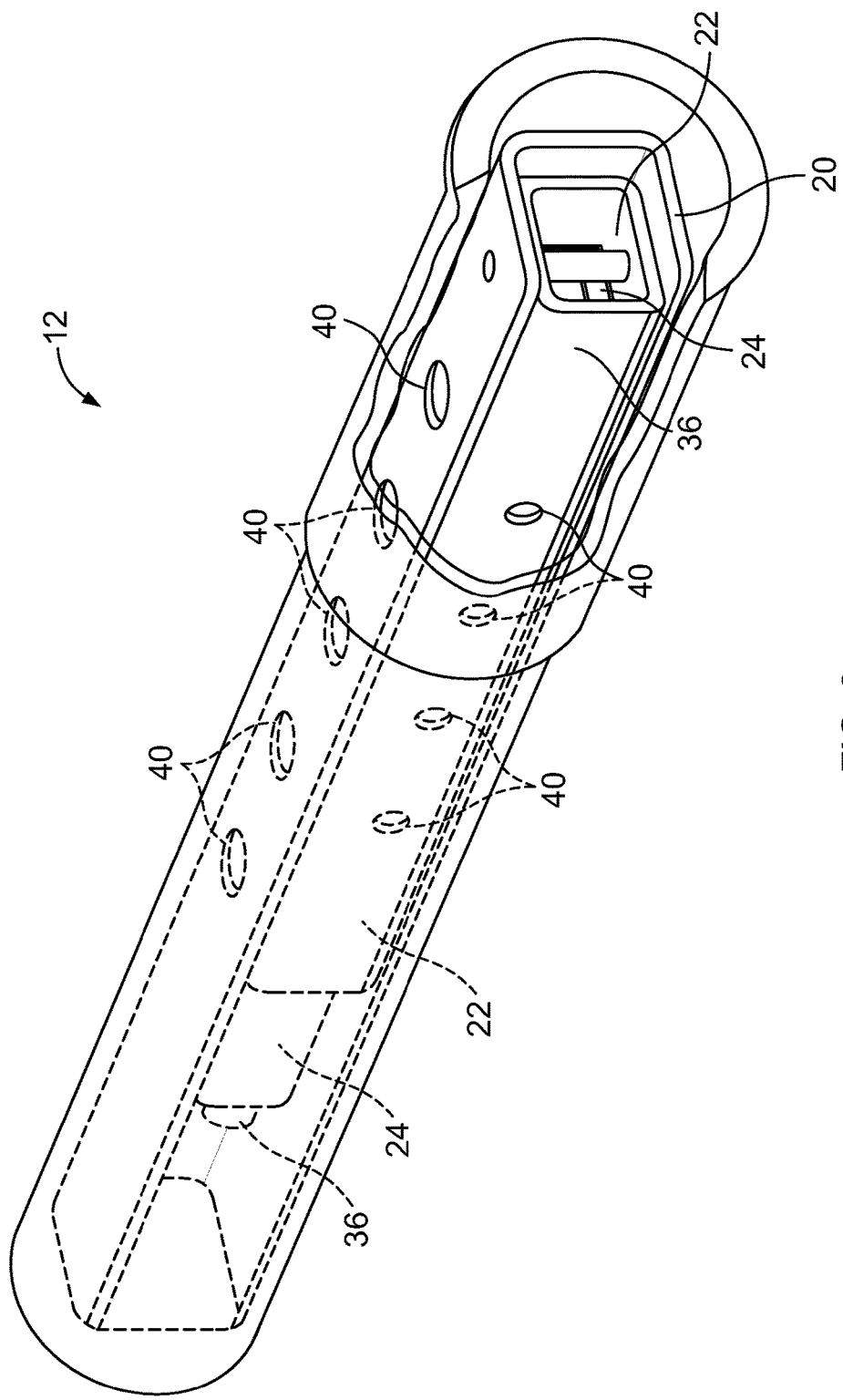
FIG. 2 is a perspective view of an example of a portion of the support assembly of FIG. 1 with a portion removed to show internal components thereof.

For example and additionally referring to FIGS. 2 and 3, each of the housings 14 may contain a first member 20, a second member 22, and a third member 24. It is contemplated that a number of members disposed within the respective housing 14 may be based on a size of the transport vehicle to facilitate extension of the first member 20 and to facilitate connection with the other members within the assembly.

The first member 20 and the respective housing 14 may be arranged with one another to facilitate a telescoping movement of the first member 20 such that the first member 20 may translate between at least a first configuration in which a portion of the first member 20 is contained within the respective housing 14 to a second configuration in which a portion of the first member 20 extends outside of the respective housing 14. For example, a set of integrated rails (not shown) may be disposed within each of the respective housings 14 for the first member 20 to translate along. A stopper (not shown) may be mounted to one of the rails to dictate a length at which the first member 20 extends out of the housing 14. The first member 20 may extend a predetermined distance based on a desired amount of space between the housing 14 and the mobility device of which is being mounted to the support assembly 10.

The second member 22 may be sized to fit within a U-shape defined by the first member 20. The second member 22 may be mounted to the first member 20 for pivotal movement. For example, the second member 22 may pivot at joint 30 between at least a stowed position and a deployed position. In another example, the second member 22 may be arranged with the first member 20 to pivot vertically. A guide (not shown) may assist in dictating the amount of pivotal movement. For example, the guide may be mounted to the first member 20 such that the second member 22 pivots to a position in alignment with a member of the opposing assembly 12.

The third member 24 may be arranged with the second member 22 to facilitate a telescoping movement of the third member 24. For example, the third member 24 may extend from within the second member 22 to a position in which the third member 24 partially extends out of the second member 22.

A connector member 36 may be mounted to one of the third members 24 to extend from therein or the connector member 36 may be a separate component that a user may mount to each of the third members 24 to join the assemblies 12 to one another. A bracket 37 may be mounted to the support assembly 10. For example, the bracket 37 may be removably secured to one of the members of the support assembly 10. The bracket 37 may be sized to support the personal mobility vehicle. It is contemplated that the bracket 37 may be sized to support more than one personal mobility vehicle or multiple items.

Each of the members may define features to assist in mounting various types of brackets, such as the bracket 37, to the support assembly 10. For example, apertures 40 may be defined by the respective member and sized to receive a hook or other similar fastener of a bracket, such as the bracket 37. In another example, the bracket 37 may include a sleeve 42 sized to receive one of the members such that the bracket 37 is secured thereto. In yet another example, the bracket 37 may include a locking feature (not shown) to secure the personal mobility vehicle or other item to the bracket 37.

Figure 3A:
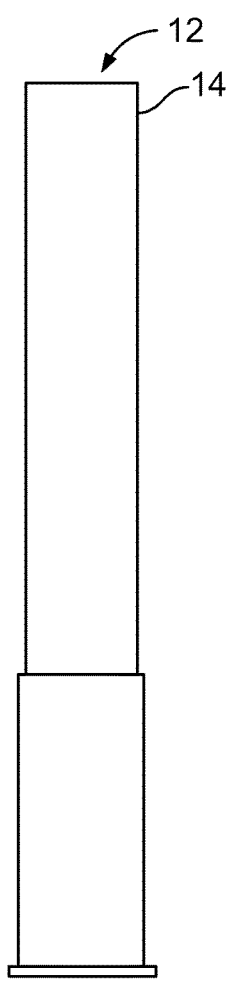
FIG. 3A is a top view of an example of a portion of the exterior support assembly of FIG. 1 shown in a first configuration.
Figure 3B:
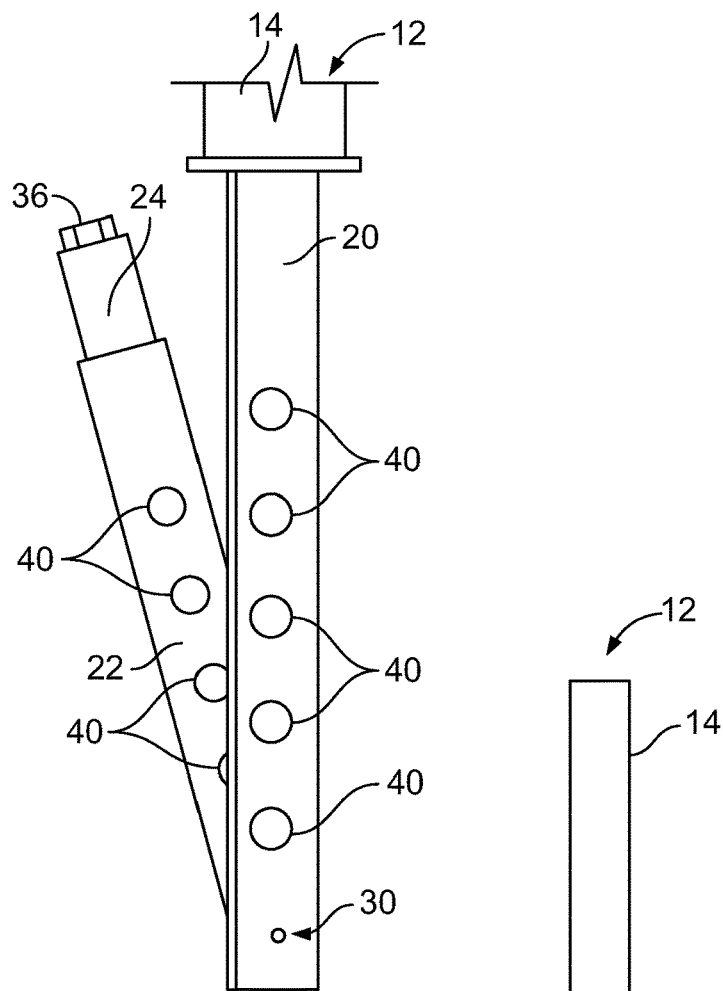
FIG. 3B is a top view of an example of a portion of the exterior support assembly of FIG. 1 shown in a second configuration.
Figure 3C:
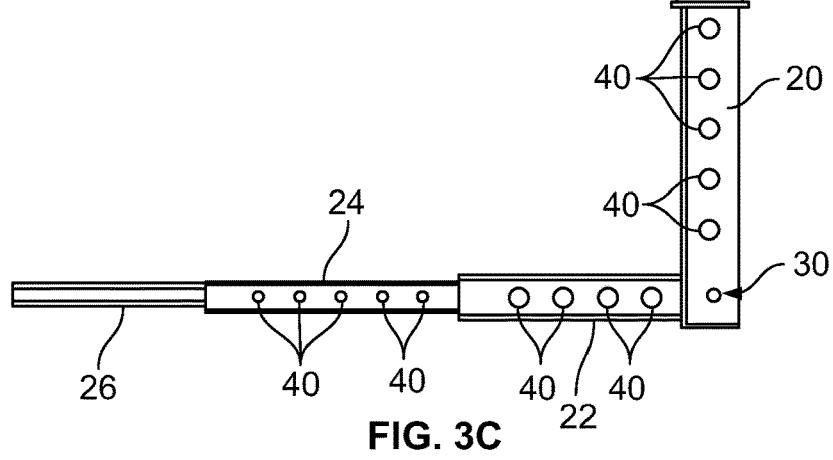
FIG. 3C is a top view of an example of a portion of the exterior support assembly of FIG. 1 shown in a third configuration.

FIGS. 3A through 3C show one of the assemblies 12 in three example configurations. FIG. 3A shows a stowed configuration in which the first member 20, the second member 22, the third member 24, and the connector member 36 are housed within the housing 14. FIG. 3B shows a configuration in which the members have extended from within the housing 14 and the second member 22 has pivoted from an at rest position. FIG. 3C shows a deployed configuration in which the first member 20 is shown extended from within the housing 14, the second member 22 is shown pivoted, the third member 24 is shown extended from within the second member 22, and the connector member 36 is shown extended from within the third member 24.

Figure 4:
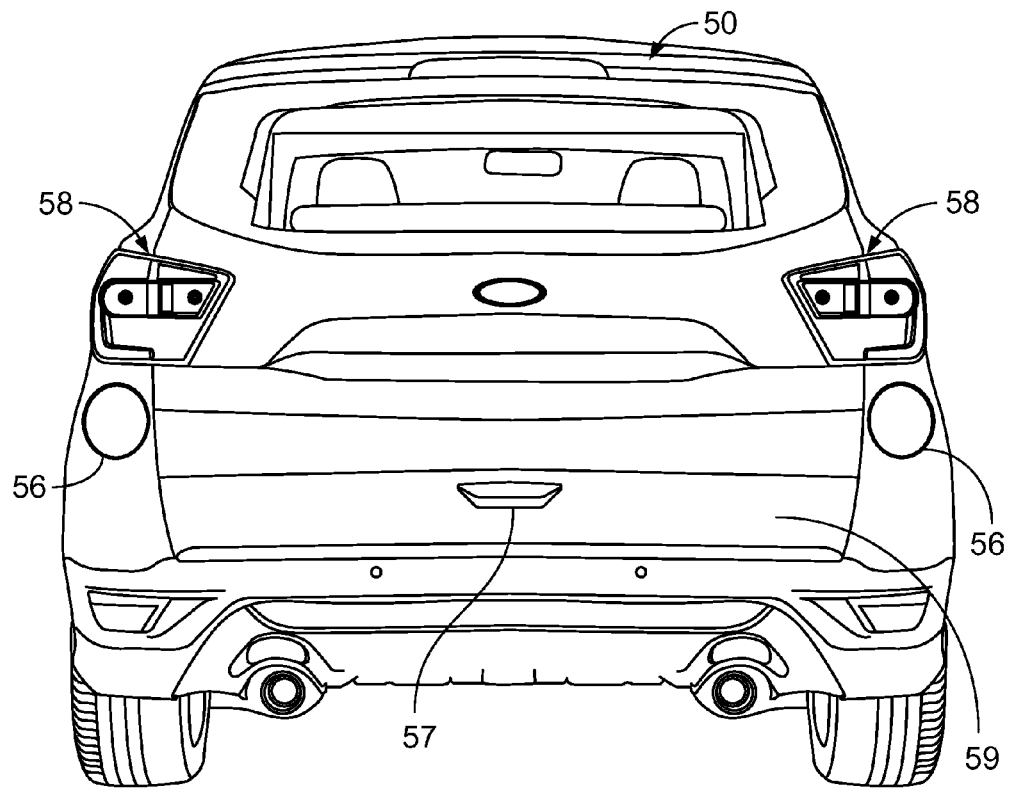
FIG. 4 is a rear view of a vehicle showing an example of a location for the support assembly of FIG. 1.
Figure 5:
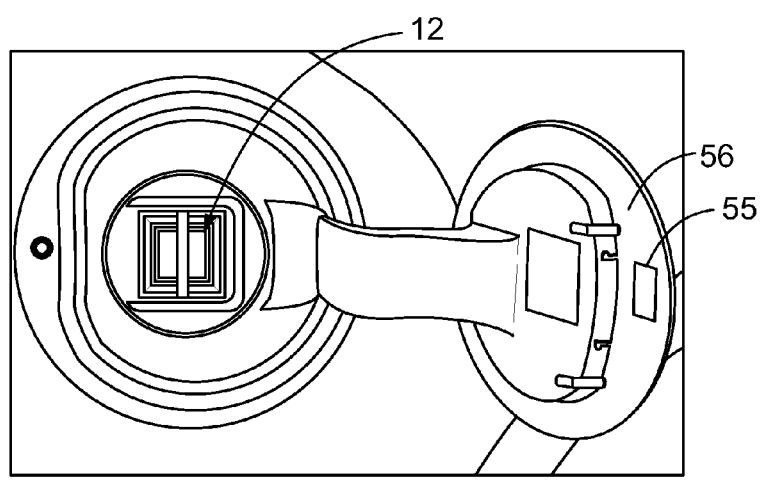
FIG. 5 is a perspective view of an example of a cover and opening for the support assembly of FIG. 1.

FIG. 4 shows an example of an automobile, referred to as a vehicle 50 herein. The support assembly 10 may operate with the vehicle 50 to provide a support structure for an item, such as a bicycle. While the vehicle 50 is shown as a car, it is contemplated that the support assembly 10 may operate with other types of vehicles, such as vans, trucks, SUVs, or motorized or towed recreational vehicles or campers. The vehicle 50 may include covers 56 located at D-pillars 58. It is also contemplated that the cover 56 may be mounted directly to the respective housing 14. Each of the covers 56 may be mounted to the vehicle 50 for pivotal movement to open and close. In the closed position, each of the covers 56 may be flush with an A-surface of the vehicle 50. FIG. 5 shows an example in which one of the covers 56 is in the open position providing access to one of the assemblies 12. Each of the covers 56 may open in a similar fashion to a fuel port access cover and may include a reflector 55. Each of the covers may be spaced equidistant from a handle 57 of a vehicle liftgate 59.

Figure 6:
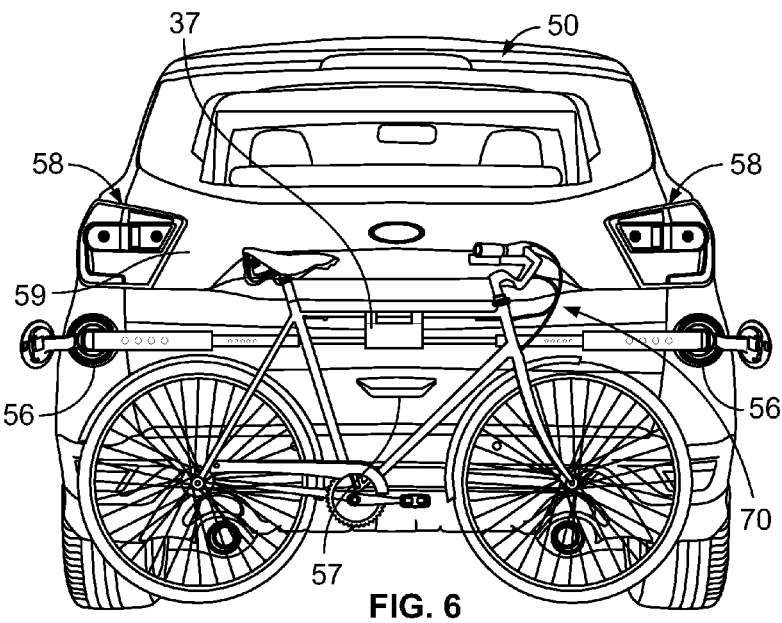
FIG. 6 is a rear view of an example of a bicycle mounted to a vehicle via the support assembly of FIG. 1.
Figure 7:
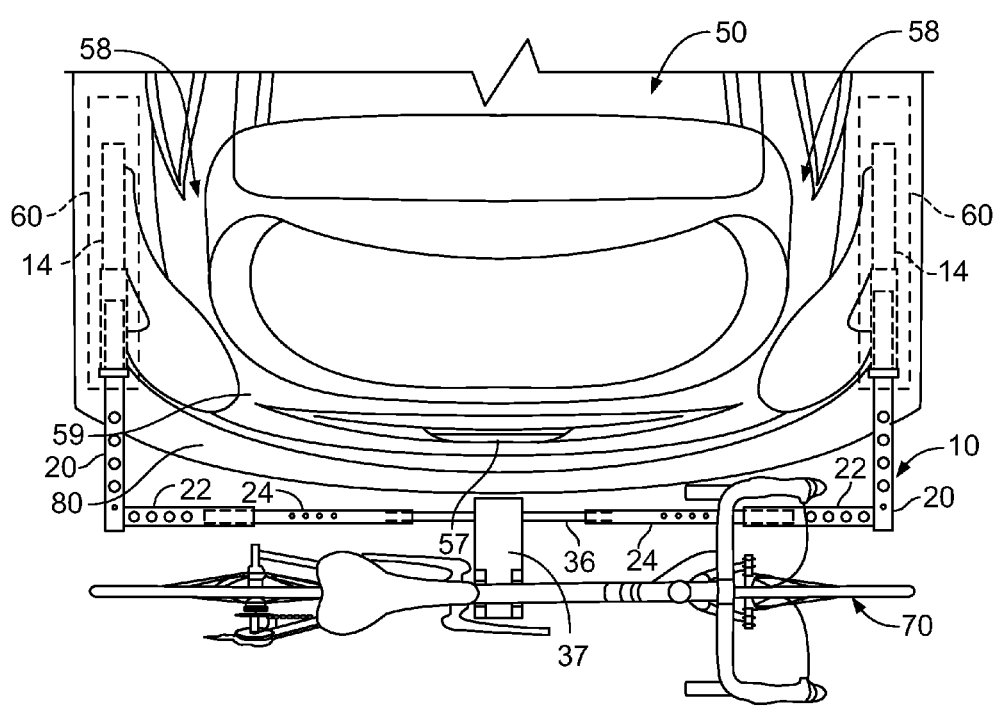
FIG. 7 is a top view showing an example of a bicycle mounted to a rear portion of a vehicle via the support assembly of FIG. 1.

FIGS. 6 and 7 show an example in which a bicycle 70 is secured to the vehicle 50. In this example, each of the first members 20 is sized to extend past a bumper 80 such that the bicycle 70 does not contact the vehicle 50 when mounted to the support assembly 10. The vehicle 50 may define cavities 60 each sized to retain one of the assemblies 12 in the stowed position. Each of the housings 14 may be secured within a panel portion of the vehicle 50 and disposed within one of the cavities 60. A user may open the respective cover 56 and then extend one of the assemblies 12 out of the respective cavity 60. For example, a user may move components of the assembly 12 from the stowed position to the deployed position as shown in FIG. 3A through 3C. Each of the covers 56 may be mounted such that the respective cover is flush with a side panel of the vehicle 50 when in an open position. This orientation may, for example, assist in reducing an aerodynamic drag on the vehicle in comparison to an orientation in which one of the covers 56 is open to a position outside of a profile of the vehicle 50.

Figure 8:
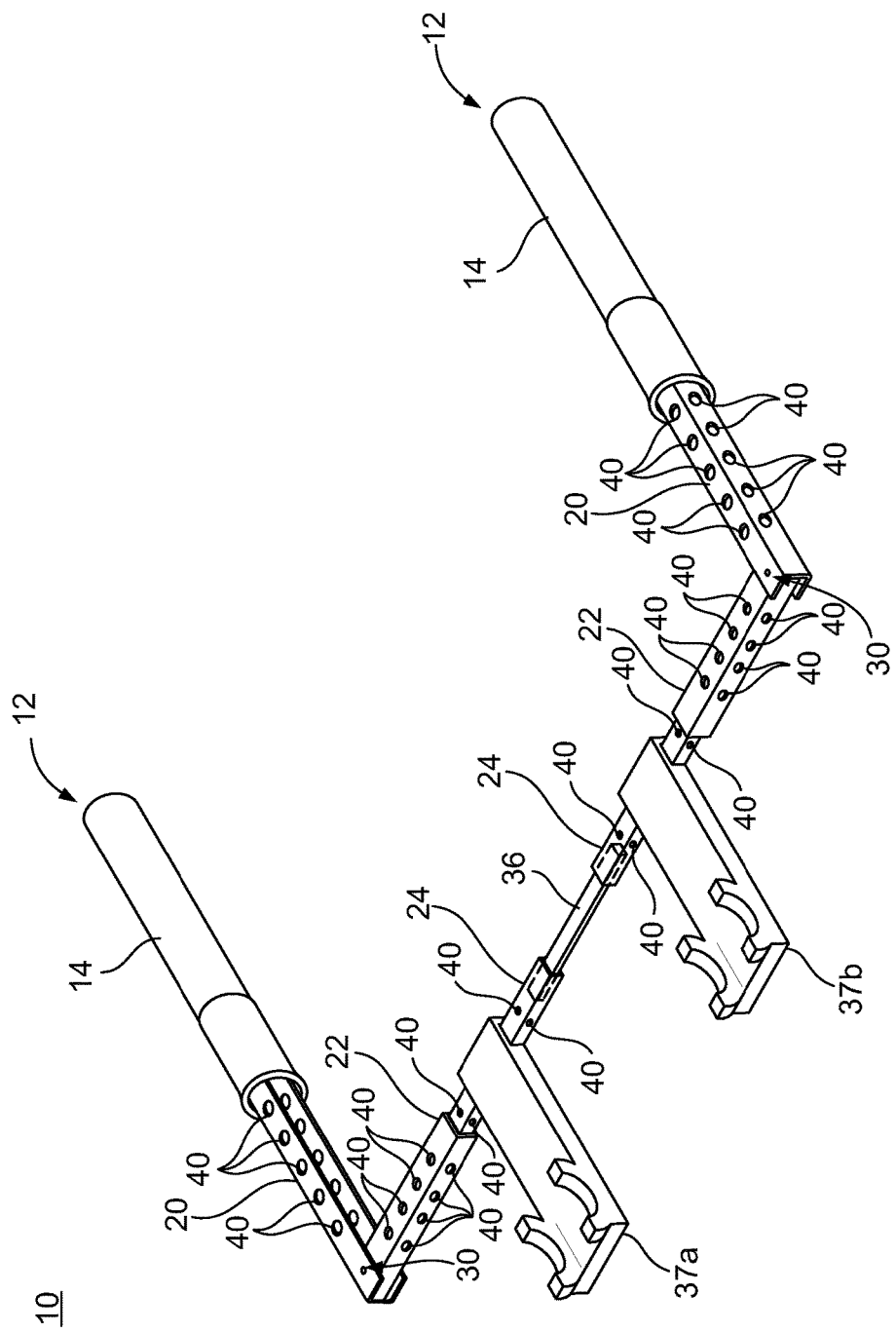
FIG. 8 is a perspective view of another example of a support assembly for a vehicle.

FIG. 8 shows an example in which the bracket 37 comprises multiple components, such as a first bracket 37*a* and a second bracket 37*b*. Each of the first bracket 37*a* and the second bracket 37*b* may include fasteners sized for insertion within one or more of the apertures 40. The first bracket 37*a* and the second bracket 37*b* may be spaced from one another to support an item, such as the bicycle 70. As another example, each of the first bracket 37*a* and the second bracket 37*b* may include a sleeve sized to receive one of the members such that the brackets 37*a* and 37*b* are secured thereto.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A personal mobility device support assembly integrated with a vehicle comprising:
    a pair of assemblies each including a housing secured within a rear panel portion of the vehicle, a first member mounted to translate from within the housing, a second member pivotally mounted to an outer end of the first member, and a third member mounted to translate from within the second member;
    a connector member to secure ends of each of the third members to one another when translated to an extended position; and
    a bracket including a sleeve for receiving a portion of one of the members and two arc portions spaced from one another,
    wherein the members are arranged with one another to move from a stowed position in which the members are positioned within a respective housing to a deployed position in which the members are extended to define a rectangular shape and the two arc portions are oriented to support a mobility device.

2. The assembly of claim 1, wherein each of the first members is sized to extend a predetermined distance such that the mobility device does not contact a bumper of the vehicle when mounted to the support assembly.

3. The assembly of claim 1, wherein the connector member is secured to translate from within one of the second members such that at least a portion of the connector member is outside of the one of the second members.

4. The assembly of claim 1, wherein the rear panel portion of the vehicle defines a cavity sized to receive one of the housings.

5. The assembly of claim 4 further comprising a cover located adjacent the cavity and mounted to a vehicle body for pivotal movement between a closed position and an open position in which one of the pair of assemblies is accessible.

6. The assembly of claim 1, wherein the mobility device is a bicycle, a stroller, a wheel chair, skis, a snowboard, or an inflatable aquatic floatation device.

7. A vehicle integrated support assembly comprising:
    a pair of housings each selectively accessible from within a vehicle panel, and each retaining a first member for translation between a stowed and a deployed position and a second member mounted to the first member for pivotal movement toward the other of the second members; and
    a bracket including a sleeve to receive a second member portion and two arc portions to receive a mobility device portion thereupon.

8. The assembly of claim 7, wherein one or more of the members defines one or more apertures sized to receive a fastener of the bracket.

9. The assembly of claim 7, wherein the vehicle comprises a vehicle body including a rear panel portion, and wherein the vehicle body and rear panel portion are arranged with one another to define a cavity sized to receive the housing.

10. The assembly of claim 9 further comprising a cover mounted adjacent to the cavity to selectively open to provide access to the housing and members.

11. The assembly of claim 7, wherein the first member is arranged with the housing to translate a predetermined distance based on a location of a vehicle bumper.

12. A mobility device support assembly comprising:
    a pair of mount assemblies, each including a tubular housing disposed within a cavity defined by a vehicle body and located between a vehicle bumper and vehicle tail lights, a first member mounted within the housing for translation between a stowed position within the housing and a deployed position in which at least a portion of the first member is extended outside the housing and past a vehicle bumper, a second member mounted at an end of the first member for pivotal movement to define an L-shape with the first member, and a third member mounted to the second member for translation;
    a connector member for securing opposing ends of each of the third members to one another; and
    a bracket for mounting to one of the members to support an item, wherein each of the members defines a square cross-sectional profile, and wherein each of the cavities of the vehicle body is spaced equidistant from a rear door handle and arranged relative to a vehicle body rear wind shield such that driver visibility through the rear wind shield is not impaired by the item when the item is mounted to the bracket and the members.

13. The assembly of claim 12, wherein the stowed position is further defined as a position in which one of the mount assemblies is concealed within a rear panel portion of the vehicle body and wherein the deployed position is further defined as a position in which one of the mount assemblies and the bracket are arranged with the vehicle to support the item.

14. The assembly of claim 12, wherein one or more of the members defines at least one aperture sized to receiver a fastener of the bracket.

15. The assembly of claim 12, wherein each of the cavities is located within a rear panel portion of the vehicle body.

16. The assembly of claim 15 further comprising a pair of pivotable covers each located adjacent one of the cavities and each flush with an A-surface of the rear panel portion in a closed position and open to the respective housing to provide access thereto in an open position.

17. The assembly of claim 12, wherein the item is a bicycle, a stroller, a wheel chair, skis, a snowboard, a tent, a back pack, luggage, a luggage carrier, tools, or an inflatable aquatic floatation device.

* * * * *